United States Patent [19] [11] 3,884,711
Varsanyi et al. [45] May 20, 1975

[54] FLOOR CARE COMPOSITIONS CONTAINING TRIS-AMINO-S-TRIAZINES

[75] Inventors: Denis Varsanyi, Arlesheim; Willy Roth, Aargau, both of Switzerland

[73] Assignee: Ciba-Geigy Corporation, Ardsley, N.Y.

[22] Filed: Mar. 27, 1974

[21] Appl. No.: 455,457

Related U.S. Application Data

[60] Continuation of Ser. No. 243,818, April 13, 1972, abandoned, which is a continuation-in-part of Ser. No. 121,139, March 4, 1971, Pat. No. 3,752,811, which is a division of Ser. No. 672,701, Oct. 4, 1967, Pat. No. 3,594,374, which is a continuation-in-part of Ser. No. 560,855, June 27, 1966, abandoned.

[30] Foreign Application Priority Data
June 30, 1965 Switzerland.......................... 9158/65

[52] U.S. Cl.................... 106/271; 106/10; 117/149

[51] Int. Cl.²......................................... C08H 9/06
[58] Field of Search......... 106/271, 231; 260/246 B, 260/249.6

[56] References Cited
UNITED STATES PATENTS

| | | | |
|---|---|---|---|
| 3,328,399 | 6/1967 | Prill | 260/249.6 |
| 3,366,601 | 1/1968 | Crager | 260/249.6 |
| 3,562,158 | 2/1971 | Varsanyi | 260/249.6 |

*Primary Examiner*—Joseph L. Schofer
*Assistant Examiner*—Paul R. Michl
*Attorney, Agent, or Firm*—Frederick H. Rabin

[57] ABSTRACT

Certain tris-amino-s-triazines are waxy constituents for use in floor care compositions, particularly floor waxes, particularly in organic solutions or aqueous emulsions.

13 Claims, No Drawings

FLOOR CARE COMPOSITIONS CONTAINING TRIS-AMINO-S-TRIAZINES

CROSS-REFERENCE

This is a continuation of application Ser. No. 243,818, filed on Apr. 13, 1972, now abandoned. Application Ser. No. 243,818 is a continuation-in-part of application Ser. No. 121,139, filed Mar. 4, 1971, now U.S. Pat. No. 3,752,811, which in turn is a division of application Ser. No. 672,701, filed Oct. 4, 1967, now U.S. Pat. No. 3,594,374. Application Ser. No. 672,701 is itself a continuation-in-part of application Ser. No. 560,855, filed June 27, 1966, now abandoned.

DETAILED DISCLOSURE

This invention concerns certain tris-amino-s-triazines, which are waxy compounds useful in various floor care compositions such as floor waxes, in organic solutions or aqueous emulsions.

By "floor care compositions" in the present description are meant compositions which can be used for the protection and conservation, e.g. by coating or waxing, of floors of all types such as, for example, floors of inorganic materials such as metal, stone, tile, etc., and or organic materials such as wood, synthetic plastics (e.g. linoleum), etc.

More particularly, the floor compositions according to this invention comprise (a) as principal constituent, a. a waxy component, from about 20 to 100 percent by weight of which calculated on the total weight of solids in the composition consists of a waxy triazine selected from compounds of the formula

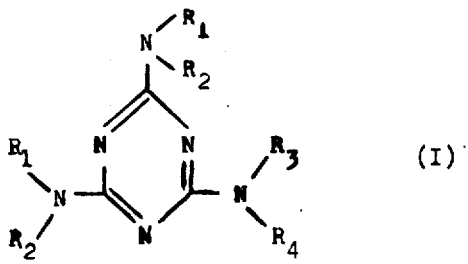

wherein
$R_1$ represents alkyl of from 1 to 5 carbon atoms,
$R_2$ represents alkyl of from 10 to 18 carbon atoms
and each of
$R_3$ and $R_4$ represents alkyl from 1 to 20 carbon atoms, and those of the formula

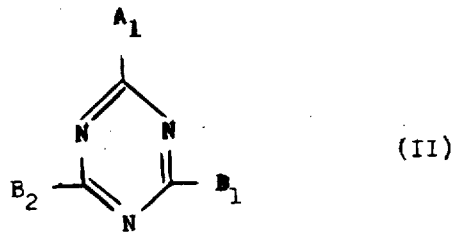

wherein
$A_1$ is selected from the grouping

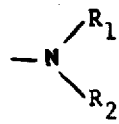

pyrrolidino, piperidino, 4-loweralkyl-piperazino, morpholino and hexamethylenimino, and each of $B_1$ and $B_2$ is selected from pyrrolidino, piperidino, 4-methylpiperazino, morpholino and hexameethyleneimino b. organic solvent compatible with the floor to be treated with said composition and in sufficient amount to dissolve the solids content of the composition, and c. from 0 percent to a sufficient amount of emulsifying agent for obtaining an aqueous emulsion of the mixture of the components (a) and (b).

When the compounds of Formulas I and II are used in major amounts (e.g. 20 to 70 percent by weight calculated on the total weight solids) in surface-treating agents, especially in floor polishes they impart to such polishes a certain gloss which is further enhanced by rubbing, e.g. with a soft cloth or the like, and resist very well subsequent washinig of such surface, in particular floors, with water or with alkaline detergents. This constitutes an important progress, because many commercially available floor polishes will show enhanced gloss after rubbing with, e.g. a soft cloth or a polishing brush, but will not withstand washing with water and especially not with alkaline agents.

In the compounds of Formula I, the presence of two amino groups $-NR_1R_2$ having one shorter and one longer alkyl substituent is necessary to obtain compounds suitable for use as main polish constituent in floor care compositions according to the invention.

The trisamino-s-triazine derivatives of Formulas I and II have well defined melting points and wax-like properties; they can thus be used instead of commercial natural and synthetic waxes or together therewith for the treatment and finishing of surfaces of all types. They have the characteristic properties of natural waxes such as solubility in fatty solvents, miscibility with natural and synthetic waxes and, with the addition of suitable emulsifying agents, can be worked up in water to form finely dispersed emulsions. The new compounds produce coatings which are resistant to chemicals, particularly they have good stability to alkali. In their excellent suitability as waxes, they are equivalent for all practical purposes to the montanic acid esters.

Surface-treating agents according to the invention are obtained by mixing a trisamino-s-triazine derivative of Formulas I or II or several such derivatives with the usual substances which are suitable for the treatment of surfaces. Such substances are, for example, the following: natural and synthetic waxes, resins, silicones, etc. which improve the physical properties, also solvents, as well as inorganic and organic fillers, e.g. silicates, milled plastics, anionic, cationic or non-ionic dispersing agents, cleansing agents such as, e.g. natural and synthetic soaps, tensioactive substances, pigments, agents to improve the stability to light, stabilizers of all types such as corosion inhibitors, scents, dyestuffs, biocidal active substances or agents containing such substances, e.g. insecticides, fungicides, bactericides, etc.

More particularly, the floor care compositions according to the invention, for instance in the form of buffable or semi-buffable floor waxes, can also contain, besides a compound or compounds of Formulas I and- /or II, as main component, volatile solvents such as are used in wood-sealing agents, namely, ethyl acetate, acetone, methylethyl ketone, ethanol, toluene and the like.

The surface-treating agents according to the invention can be in the form of and used as aerosols, solvents, emulsions, semi-solid and solid pastes. The agents can thus serve to protect and to preserve floors (e.g. polishing waxes) of all types.

Some trisamino-s-triazines of Formula I are known compounds but have been used hitherto only as herbicides, obtained by well-known methods.

The following non-limitative examples describe surface finishing agents according to the invention. Where not otherwise stated, parts and percentages are given therein by weight. The abbreviations A.N. and S.N. signify acid number and saponification number, respectively. The temperatures are given in degrees Centigrade.

Example 1

| | | |
|---|---|---|
| (a) | 4.95 | parts of 2,4-bis-morpholino-6-N-methyl-N-n-octa-decylamino-s-triazine |
| | 4.05 | parts of petroleum wax (M.P. 86–88°; A.N. 13–16; S.N. 45–55; penetration 4–6 at 100 g/25°/5 sec.) |
| | 0.63 | part of emulsifying agent of the fatty alcohol polyglycol ether type |
| | 0.54 | part of olein |
| | 0.54 | part of aminomethyl propanol |
| | 77.89 | parts of water |
| (b) | 1.20 | parts of synthetic resin (phenolic resin modified with colophony) |
| | 0.40 | part of conc. ammonia |
| | 8.40 | parts of water |
| (c) | 0.02 | part of wetting agent (perfluorinated hydrocarbon with solubilizing groups) |
| | 0.40 | part of tris-(butoxyethyl)-phosphate |
| | 0.98 | part of water. |

The components of the mixture (a), with the exception of water, are melted at 150°, the homogeneous melt is cooled to 100° – 110° and then slowly added, while stirring strongly, to the boiling water. The emulsion formed is cooled to room temperature and first the mixture (b) and then mixture (c) are added while stirring.

The resultant gloss-imparting emulsion wax composition is excellently suitable for the care of modern floors.

Example 2

| | | |
|---|---|---|
| (a) | 2.24 | parts of 2-di-iso propylamino-4,6-bis-(methyl-octadecylamino)-s-triazine |
| | 1.68 | parts of carnauba wax |
| | 1.68 | parts of ester wax (montanic acid ester type; M.P. 80–83°; A.N. 20–30; S.N. 135–150) |
| | 0.44 | part of emulsifying agent (fatty alcohol polyglycol ether type) |
| | 0.40 | part of olein |
| | 0.40 | part of aminomethyl propanol |
| | 33.16 | parts of water |
| (b) | 16.70 | parts of polystyrene emulsion having 36% polymers |
| | 0.10 | part of wetting agent (alkylphenol polyglycol ether type) |
| | 23.20 | parts of water |
| (c) | 3.00 | parts of polyester resin |
| | 1.00 | part of conc. ammonia |
| | 16.00 | parts of water. |

The component of the mixture (a), with the exception of the water, are melted at 150°, the homogeneous melt is cooled to 100° – 110° and then added, while stirring strongly, to the boiling water. The emulsion formed is cooled to room temperature and the mixtures (b) and (c) are added one after the other while stirring.

The resultant wax-polymer emulsion is excellently suited for the care of modern floors in that the coating itself possesses a certain gloss which can, however, be increased by polishing.

Example 3

| | | |
|---|---|---|
| (a) | 4.250 | parts of 2,4-bis(morpholino)-6-(N-methyl-N-n-octadecylamino)-s-triazine |
| | 4.250 | parts of wax (montanic acid ester type, M.P. 80–83°; A.N. 20–30; S.N. 135–150) |
| | 4.250 | parts of petroleum wax (M.P. 86–88°; A.N. 13–16; S.N. 45–55; penetration 4–6 at 100g/25°/5 sec) |
| | 0.850 | part of olein |
| | 0.765 | part of emulsifying agent (fatty alcohol polyglycol ether type) |
| | 0.680 | part of aminomethyl propanol |
| | 69.955 | parts of water |
| (b) | 2.250 | parts of synthetic resin (phenolic resin modified with colophony) |
| | 0.675 | part of conc. ammonia |
| | 12.075 | parts of water |

The components of the mixture (a), with the exception of the water, are melted at 150°, the homogeneous melt is cooled to 100° – 110° and then slowly added, while stirring, to the boiling water. The emulsion formed is cooled to room temperature and the mixture (b) is added while stirring.

The resultant buffable emulsion wax is excellently suitable for the care of modern floors; gloss is produced thereon by subsequent rubbing with a soft cloth.

EXAMPLE 4

5.0 parts of 2-(N'-methyl-piperazino)-4-morpholino-6-(N''-methyl-N''-n-octadecyl-amino)-s-triazine are dissolved in 95.0 parts of isopropanol, if necessary while heating, whereupon a clear solution is formed.

Floors treated with this solution and buffed repeatedly show a gloss equivalent to that obtained with the compositions of the preceding examples.

The triazine used in Example 4, supra, is produced as follows:

185 parts of cyanogen chloride are dissolved in 1,000 parts of carbon tetrachloride and 87.1 parts of morpholine are added while stirring intensively at 0° to 5°. A solution of 54 parts of sodium carbonate in 300 parts of water is then added. After stirring for 2 hours, a solution of 290 parts of N-methyl-N-n-octadecylamine in 1,000 parts of carbon tetrachloride is added dropwise at 10° to 15° and then a solution of 54 parts of sodium carbonate in 300 part of water is added dropwise. The whole is then slowly heated and afterwards refluxed ffor 5 hours. On completion of the reaction, the solvent is distilled off. The residue is stirred with 1,500 parts of acetone. The undissolved part is filtered off under suction, thoroughly washed with water and dried, 2-chloro-4-morpholino-6-N-methyl-N-n-octadecylamino-s-triazine is obtained which, after recrystallization from alcohol, melts at 52°–54°.

482 parts of 2-chloro-4-morpholino-6-N-methyl-N-n-octadecylamin-s-triazine and 110 parts of N-methylpiperizine are dissolved in 4,000 parts of warm xylene and 45 parts of pulverized sodium hydroxide are added. The whole is then refluxed in a water separator under an atmosphere of nitrogen. On completion of the water separation, the mixture is refluxed for another 3 hours. The reaction mixture is filtered hot, the filtrate is evaparated to dryness in vacuo and the residue is stirred with 4,000 parts of acetone. The solid, undissolved part is separated, thoroughly washed with water and dried in vacuo. 2-N'-methylpiperazino-4-morpholino-6-N''-methyl-N''-n-octadecylamino-s-triazine is obtained which, after recrystallisation from dioxan melts at 48°–51°.

Example 5

| | | |
|---|---|---|
| (a) | 3.19 | parts of 2-(N-methyl-N-n-octadecyl-amino)-4,6-bis-(N'-methyl-piperazino)-s-triazine, |
| | 3.19 | parts of paraffin (M.P. 50–52°), |
| | 6.38 | parts of montanic acid ester wax, (M.P. 80–83°, A-N. 20–30; S.N. 135–150), |
| | 1.70 | parts of olein, |
| | 1.36 | parts of aminomethyl propanol, |
| | 1.53 | parts of cetyl alcohol polyglycol ether with 4 to 5 ethyleneoxy groups, as emulsifying agent, |
| | 67.66 | parts of water; |
| (b) | 2.25 | parts of alkali-soluble solid phenol/formaldehyde resin, dissolved in a mixture of |
| | 0.67 | part of aqueous concentrated ammonia (25%) and |
| | 12.07 | parts of water. |

The components of mixture (a), with the exception of the water, are melted at 150° and stirred until a homogeneous melt is obtained. The melt is cooled to 100° – 110°, the water is brought to the boil and is then added thereto, and the resulting mixture (a) is cooled to room temperature. This mixture (a) is obtained in the form of an emulsion to which the solution (b) is added. The resultant emulsion is excellently suitable for the care of modern floors, such as "vinyl" flooring.

EXAMPLE 6

(a)

15 parts of 2,4-bis-morpholino-6-(N-methyl-N-n-octadecyl-amino)-s-triazine were dissolved in 80 parts of petroleum fraction having a boiling range of from 150° to 180°C and 5.0 grams of 1,4-dioxane by heating under reflux to 90° on the water bath.

A linoleum floor was treated with the resulting liquid composition and buffed 160 times with a buffing machine: A gloss of 20 was obtained on a 45° gloss meter of the Lange type (100 being the gloss of a black mirror viewed under the angle of 45°).

Similar results are obtained when replacing the triazine compound of Example 6 by the same amount of one of the following triazines:

(b) 2,4,6-tris-(methyl-dodecyl)-s-triazine
(c) 2,4,6-tris-morpholino-s-triazine
(d) 2-diisopropylamino-4,6-bis-(methyl-octadecyl-amino)-s-triazine.

The resulting floor wax compositions of Examples 6 (a–c) are excellently suitable for the care of modern floors. More especially the treated floors are rendered non-slippery by buffing for about 20 times. This is due to an anti-slip effect of the above-described compositions.

If similar dynamic slip resistance values as shown by the aforesaid compositions of Example 6 (a–c), are to be attained also in the case of conventional compositions, a considerable amount of adjuvant such as finely dispersed silica would have to be added, but would lead to a strong reduction of gloss in the polished surface. Floors treated with the compositions according to the invention and buffed in a normal manner therefore combine high gloss with pronounced slip-resistance.

Thus, floors treated with the compositions of Examples 6 (a–d) and buffed 20 times showed the following anti-slip values (in grams) determined with a Pesola Dynamometer (for 0 to 30 g) and a standardized measuring body:

| Example | Antislip value (grams) |
|---|---|
| 6 a | 24 |
| 6 b | 24 |
| 6 c | 29 |

Example 7

| | | |
|---|---|---|
| (a) | 4.480 | parts of 2,4-bis-(ethyl-decylamino)-6-diocta-decylamino-s-triazine |
| | 3.360 | parts of a polymeric wax (reaction product of hydrocarbon material and isocyanate, softening point 93°, A.N. 25–35; S.N. 50–65; penetration 1–3 at 100g/25°/5 sec.) |
| | 2.800 | parts of montanic acid ester wax (M.P. 80–83°; A.N. 20–30; S.N. 135–150) |
| | 0.560 | part of montanic acid ester wax (M.P. 80–83°; A.N. 140–155; S.N. 160–180) |
| | 0.448 | part of emulsifying agent of the fatty alcohol polyglycol ether type |
| | 0.560 | part of aminomethyl propanol |
| | 0.224 | part of a saturated aqueous solution of KOH |
| | 66.568 | parts of water |
| (b) | 2.80 | parts of synthetic resin (phenolic resin modified with colophony) |
| | 1.00 | part of concentrated ammonia |
| | 16.20 | parts of water |
| (c) | 0.01 | part of wetting agent (perfluorinated hydrocarbon with solubilizing group) |
| | 0.99 | part of water |

The compounds of the mixture (a), with the exception of water, are melted at 150°, the homogeneous melt is cooled to 100° – 110° and then slowly added, while stirring strongly, to the boiling water. The emulsion formed is cooled to room temperature and first the mixture (b) and then mixture (c) are added while stirring.

EXAMPLE 8

Similar surface-treating compositions according to the invention are produced by replacing the triazine component in each of the compositions of the preceding examples by an equivalent amount of an s-triazine of the formula I in which A,B and C represent the substituent groups shown in the respective columns of the following table.

The s-triazine derivatives are produced by the methods exemplified hereinbefore using equivalent amounts of correspondingly substituted starting materials.

Table

| Example 8 No. | A | B | C |
|---|---|---|---|
| (1) | -N(CH₃)(C₁₈H₃₇) | -N⟨pyrrolidine⟩ | -N⟨pyrrolidine⟩ |
| (2) | -N(CH₃)(C₁₈H₃₇) | -N⟨piperidine⟩ | -⟨cyclohexyl⟩ |
| (3) | -N(CH₃)(C₁₈H₃₇) | -N⟨N-CH₃ piperazine⟩ | -N⟨N-CH₃ piperazine⟩ |
| (4) | -N(C₅H₁₁)(C₁₈H₃₇) | -N⟨morpholine⟩ | -N⟨morpholine⟩ |
| (5) | -N(CH₃)(C₁₈H₃₇) | -N(CH₃)(C₁₈H₃₇) | -N(C₂H₅)(C₂H₅) |
| (6) | -N(C₄H₉)(C₁₈H₃₇) | -N(C₄H₉)(C₁₈H₃₇) | -N(CH₃)(CH₃) |
| (7) | -N(CH₃)(C₁₂H₂₅) | -N⟨morpholine⟩ | -N⟨morpholine⟩ |
| (8) | -N(CH₃)(C₁₈H₃₇) | -N(C₅H₁₁)(C₁₈H₃₇) | -N(C₅H₁₁)(C₅H₁₁) |
| (9) | -N(C₂H₅)(C₁₆H₃₃) | -N(C₄H₉)(C₁₀H₂₁) | -N(C₄H₉)(C₄H₉) |

Table — Continued

| No. | A | B | C |
|---|---|---|---|
| (10) | $-N\begin{smallmatrix}C_3H_7\\C_{12}H_{25}\end{smallmatrix}$ | $-N\begin{smallmatrix}C_3H_7\\C_{12}H_{25}\end{smallmatrix}$ | $-N\begin{smallmatrix}C_3H_7\\C_{12}H_{25}\end{smallmatrix}$ |
| (11) | $-N\begin{smallmatrix}C_2H_5\\C_{16}H_{33}\end{smallmatrix}$ | $-N\begin{smallmatrix}C_2H_5\\C_{16}H_{33}\end{smallmatrix}$ | $-N\begin{smallmatrix}C_2H_5\\C_{16}H_{33}\end{smallmatrix}$ |
| (12) | $-N\begin{smallmatrix}C_5H_{11}\\C_{18}H_{37}\end{smallmatrix}$ | $-N\begin{smallmatrix}C_5H_{11}\\C_{18}H_{37}\end{smallmatrix}$ | $-N\begin{smallmatrix}CH_3\\CH_3\end{smallmatrix}$ |
| (13) | $-N\begin{smallmatrix}CH_3\\C_{16}H_{33}\end{smallmatrix}$ | $-N\begin{smallmatrix}C_5H_{11}\\C_{10}H_{21}\end{smallmatrix}$ | $-N\begin{smallmatrix}C_2H_5\\C_2H_5\end{smallmatrix}$ |
| (14) | $-N\begin{smallmatrix}C_2H_5\\C_{12}H_{25}\end{smallmatrix}$ | $-N\begin{smallmatrix}C_4H_9\\C_{12}H_{25}\end{smallmatrix}$ | $-N\begin{smallmatrix}C_3H_7\\C_3H_7\end{smallmatrix}$ |
| (15) | $-N\begin{smallmatrix}C_3H_7\\C_{10}H_{21}\end{smallmatrix}$ | $-N\begin{smallmatrix}C_3H_7\\C_{15}H_{33}\end{smallmatrix}$ | $-N\begin{smallmatrix}C_4H_9\\C_4H_9\end{smallmatrix}$ |
| (16) | $-N\begin{smallmatrix}C_4H_9\\C_{18}H_{37}\end{smallmatrix}$ | $-N\begin{smallmatrix}C_2H_5\\C_{18}H_{37}\end{smallmatrix}$ | $-N\begin{smallmatrix}C_{18}H_{37}\\C_2H_5\end{smallmatrix}$ |
| (17) | $-N\begin{smallmatrix}C_2H_5\\C_{12}H_{25}\end{smallmatrix}$ | $-N\begin{smallmatrix}CH_3\\C_{16}H_{33}\end{smallmatrix}$ | $-N\begin{smallmatrix}C_2H_5\\C_2H_5\end{smallmatrix}$ |

Compounds falling under Formula 1 mentioned in Examples 1 to 3 and 5 to 8 are produced analogously to the process illustrated in Example 4 from the correspondingly substituted starting materials.

We claim:

1. A floor care composition comprising
    a. a waxy component, from about 20 to 100 percent by weight of which calculated on the total weight of solids in the composition consists of a waxy triazine of the formula

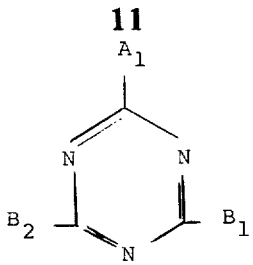

wherein $A_1$ is selected from the group consisting of

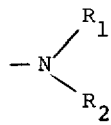

in which $R_1$ represents alkyl of from 1 to 5 carbon atoms, and
$R_2$ represents alkyl of from 10 to 18 carbon atoms, pyrrolidino, piperidino, 4-methyl-piperazino, morpholino and hexamethyleneimino, and each of $B_1$ and $B_2$ is selected from the group consisting of pyrrolidino, piperidino, 4-methylpiperazino, morpholino and hexamethyleneimino, b. a volatile organic solvent compatible with the floor to be treated with said composition and in sufficient amount to dissolve the solids content of the composition, and c. from 0 percent to a sufficient amount of emulsifying agent for obtaining an aqueous emulsion of the mixture of the components (a) and (b), said floor-care composition being an organic solution or an aqueous emulsion capable, after evaporation of the solvent (b), of forming on a wooden floor a waxy, non-slippery coating having a gloss enhanceable by rubbing with a soft cloth, said coating being resistant to water and alkaline detergents.

2. A floor care composition as described in claim 1, wherein said waxy triazine is 2-(N'-methylpiperazino)-4-morpholino-6-(N''-methyl-N''-n-octadecylamino)-s-triazine.

3. A floor care composition as described in claim 1, wherein said waxy triazine is 2-(N-methyl-N-n-octadecylamino)-4,6-bis(N'-methylpiperazino)-s-triazine.

4. A floor care composition as described in claim 1, wherein said waxy triazine is 2,4,6-tris(morpholino)-s-triazine.

5. A floor care composition as described in claim 1, wherein said waxy triazine is 2,4-bis-(morpholino)-6-(N-methyl-N-n-octadecylamino)-s-triazine.

6. A method for forming on a wooden floor a waxy, non-slippery coating resistant to water and alkaline detergents, and having a gloss enhanceable by rubbing with a soft cloth, said method comprising applying thereto a composition comprising a. a waxy component, from about 20 to 100 percent by weight of which calculated on the total weight of solids in the composition consists of a waxy triazine of the formula

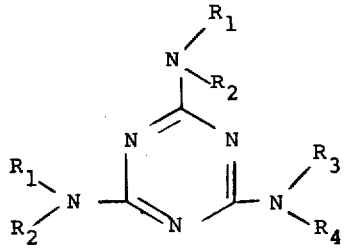

wherein $R_1$ represents alkyl of from 1 to 5 carbon atoms,
$R_2$ represents alkyl of from 10 to 18 carbon atoms, and each of $R_3$ and $R_4$ represents alkyl from 1 to 20 carbon atoms, b. a volatile organic solvent compatible with the floor to be treated with said composition and in sufficient amount to dissolve the solids content of the composition, and c. from 0 percent to a sufficient amount of emulsifying agent for obtaining an aqueous emulsion of the mixture of the components (a) and (b).

7. A method according to claim 6 in which the waxy triazine is 2-diisopropylamino-4,6-bis(N-methyl-N-n-octadecylamino)-s-triazine.

8. A method according to claim 6 in which the waxy triazine is 2,4-bis(N-ethyl-N-decylamino)-6-dioctadecylamino-s-triazine.

9. A method for forming on a wooden floor a waxy, non-slippery coating resistant to water and alkaline detergents, and having a gloss enhanceable by rubbing with a soft cloth, said method comprising applying thereto a composition comprising (a) a waxy component, from about 20 to 100 percent by weight of which calculated on the total weight of solids in the composition consists of a waxy triazine of the formula

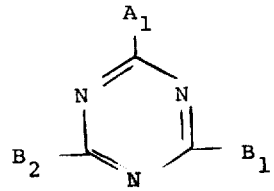

wherein $A_1$ is selected from the group consisting

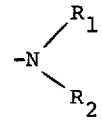

in which $R_1$ represents alkyl of from 1 to 5 carbon atoms, and
$R_2$ represents alkyl of from 10 to 18 carbon atoms, pyrrolidino, piperidino, 4-methyl-piperazino, morpholino and hexamethyleneimino, and each of $B_1$ and $B_2$ is selected from the group consisting of pyrrolidino, piperidino, 4-methylpiperazino, morpholino and hexamethyleneimino, b. a volatile organic solvent compatible with the floor to be treated with said composition and in sufficient amount to dissolve the solids content of the composition, and c. from 0 percent to a sufficient amount of emulsifying agent for obtaining an aqueous emulsion of the mixture of the components (a) and (b).

10. A method according to claim 9 in which the xaxy triazine is 2-(N'-methylpiperazino)-4-morpholino-6-(N''-methyl-N''-n-octadecylamino)-s-triazine.

11. A method according to claim 9 in which the waxy triazine is 2-(N-methyl-N-n-octadecylamino)-4,6-bis(N'-methyl-piperazino)-s-triazine.

12. A method according to claim 9 in which the compound is 2,4,6-tris(morpholino)-s-triazine.

13. A method according to claim 9 in which the compound is 2,4-bis(morpholino)-6-(N-methyl-N-n-octadecylamino)-s-triazine.

* * * * *